United States Patent
Ko et al.

(10) Patent No.: US 12,221,053 B2
(45) Date of Patent: Feb. 11, 2025

(54) DOOR-MOUNTED PASSENGER PROTECTION DEVICE AND CONTROL METHOD THEREOF

(71) Applicant: HYUNDAI MOBIS CO., LTD., Seoul (KR)

(72) Inventors: Seok Hoon Ko, Yongin-si (KR); Seok Min Lee, Yongin-si (KR); Dae Chang Jung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/455,591

(22) Filed: Aug. 24, 2023

(65) Prior Publication Data

US 2024/0190376 A1  Jun. 13, 2024

(30) Foreign Application Priority Data

Dec. 7, 2022 (KR) .......... 10-2022-0169939

(51) Int. Cl.
| | |
|---|---|
| *B60R 21/21* | (2011.01) |
| *B60R 13/02* | (2006.01) |
| *B60R 21/013* | (2006.01) |
| *B60R 21/264* | (2006.01) |
| *B60R 21/00* | (2006.01) |
| *B60R 21/02* | (2006.01) |

(52) U.S. Cl.
CPC .......... *B60R 21/21* (2013.01); *B60R 13/0243* (2013.01); *B60R 21/013* (2013.01); *B60R 21/264* (2013.01); *B60R 2021/0006* (2013.01); *B60R 2021/0055* (2013.01); *B60R 2021/0273* (2013.01)

(58) Field of Classification Search
CPC ............ B60R 21/21; B60R 2021/0273; B60R 13/0243; B60R 21/013; B60R 21/264; B60R 2021/0006; B60R 2021/0055
See application file for complete search history.

(56) References Cited

U.S. PATENT DOCUMENTS

| | | | |
|---|---|---|---|
| 2008/0114516 A1* | 5/2008 | Jackson | ............ B60R 21/0428 |
| | | | 280/736 |
| 2015/0158592 A1* | 6/2015 | Meister | .................. B60R 21/02 |
| | | | 244/121 |

FOREIGN PATENT DOCUMENTS

KR   10-0526147   11/2005

* cited by examiner

*Primary Examiner* — Jason D Shanske
*Assistant Examiner* — Matthew James O'Neill
(74) *Attorney, Agent, or Firm* — DLA Piper LLP US (57) ABSTRACT

Technology for safely protecting a passenger's pelvic region and below in the event of a side crash and a door-mounted passenger protection device and a method of controlling the device that includes a pusher moving from the inside of the door toward a passenger seated in a seat to be supported by the passenger's body and a pusher moving device applying air pressure to the pusher to move the pusher toward the passenger.

15 Claims, 8 Drawing Sheets

DOOR-MOUNTED PASSENGER PROTECTION DEVICE AND CONTROL METHOD THEREOF

CROSS REFERENCE TO RELATED APPLICATION

The present application claims priority to Korean Patent Application No. 10-2022-0169939, filed on Dec. 7, 2022, the entire content of which is incorporated herein for all purposes by this reference.

BACKGROUND

Technical Field

The present disclosure relates to a door-mounted passenger protection device and a method of controlling the device for safely protecting a passenger's pelvic region and below in a side crash situation.

Description of the Related Art

In the event of a side crash of a vehicle, a curtain airbag deploys from the inside of the headliner of the vehicle while a side airbag deploys from the side of a seat to minimize injury to passengers.

In particular, the side airbag is embedded in a bolster part of a seatback and deploys from the side of the passenger's chest in the event of an accident to protect the passenger's shoulder to the pelvic region.

However, a problem is that the side airbag does not sufficiently protect the femoral area located below the pelvis.

Therefore, it is necessary to expand the protection area by the side airbag downward, but there is a limit to the internal pressure of the gas that can be generated by the inflator, and as the cushion increases in size, the package also increases, making it difficult to mount the side airbag in the seat.

In particular, as the degree of freedom of passengers increases in the cabin of future mobility, the seatback of a seat arranged in a relaxed mode flips back, further reducing the cover area below the pelvic region.

The matters described above as background technology are intended to provide a better understanding of the background of the present disclosure and should not be considered as acknowledging that the present disclosure pertains to the art already known to those skilled in the art.

SUMMARY

An object of the present disclosure is to provide a door-mounted passenger protection device and a method of controlling the device for safely protecting a passenger's pelvic region and below in a side crash situation.

According to the present disclosure, the door-mounted passenger protection device may include a pusher moving from inside of the door toward a passenger seated in a seat to be supported by the passenger's body and a pusher moving device applying air pressure to the pusher to move the pusher toward the passenger.

The pusher may be supported on the passenger's pelvic region.

The pusher moving device may include an air pocket provided inside the door to inflate toward the pusher when filled with gas and push the pusher toward the passenger and a gas generator supplying gas into the air pocket.

A door panel installed on the door and a pocket housing mounted on the door panel to stow the air pocket inside and assembled to be covered by the pusher to guide the movement of the pusher may be further included.

The air pocket may inflate in a space between the pocket housing and the pusher.

A movement amount restriction portion restricting movement amount of the pusher that moves toward the passenger may be further included.

The movement amount restriction portion may include an elongated slot formed in the pusher in the moving direction of the pusher and a stopper formed in the pocket housing to pass through the slot to engage with an inner surface of the slot in the moving process of the pusher.

A movement switching portion that restricts the movement of the pusher when the air pocket does not inflate and allows the movement of the pusher when the air pocket inflates may be further included.

The movement switching portion may include an elongated slot formed in the pusher in the moving direction of the pusher, a pressing portion formed in the pocket housing to pass through the slot, and a support portion temporarily restricting the movement of the pusher when supported between the inner surface of the slot and the pressing portion and allowing the movement of the pusher when the support structure deforms by the pressure applied from the pressing portion.

The support structure of the support portion may deform due to a column-shaped structure having a narrower cross-sectional width than the slot.

A weak rigidity portion may be formed in the support portion.

The weak rigidity portion may be formed in a notched shape.

A door panel installed on the door and a door trim assembled cover the door panel in the door and provided with a matching hole matching the appearance of the pusher for the pusher to be inserted thereinto may be further included.

The pocket housing may be mounted on the door panel through a mounting bracket, and a gas generator may be fastened to the mounting bracket together with the pocket housing.

A crash sensor detecting a side crash and the crash direction of the vehicle and a controller moving the pusher installed on the door on the side of the crash impact toward a passenger in the event of the side crash of the vehicle may be further included.

A method of controlling the door-mounted passenger protection device may include detecting a side crash and a crash direction of the vehicle by a controller and pushing a pusher installed on the door on the side of the crash impact toward the passenger by the controller in the event of the side crash of the vehicle.

According to the present disclosure, the pusher installed on the door is used to push the passenger in the direction away from the crash impact in the event of a side crash of the vehicle, thereby having the effect of safely protecting the passenger by absorbing and mitigating the impact energy applied to the passenger.

Furthermore, even when sufficient space is not secured between the door and the passenger, the pusher operates smoothly, thereby having the advantage of effectively protecting the passenger's pelvis and femur.

DETAILED DESCRIPTION

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

A controller may include a communication device that communicates with other controllers or sensors to control functions it is charged with, a memory for storing an operating system, logic commands, input and output information, and the like, and one or more processors performing functions such as decision-making, calculation, determination, and the like required for controlling the functions with which it is charged.

A detailed description of preferred embodiments of the present disclosure with reference to accompanying drawings is as follows.

Figure 1:
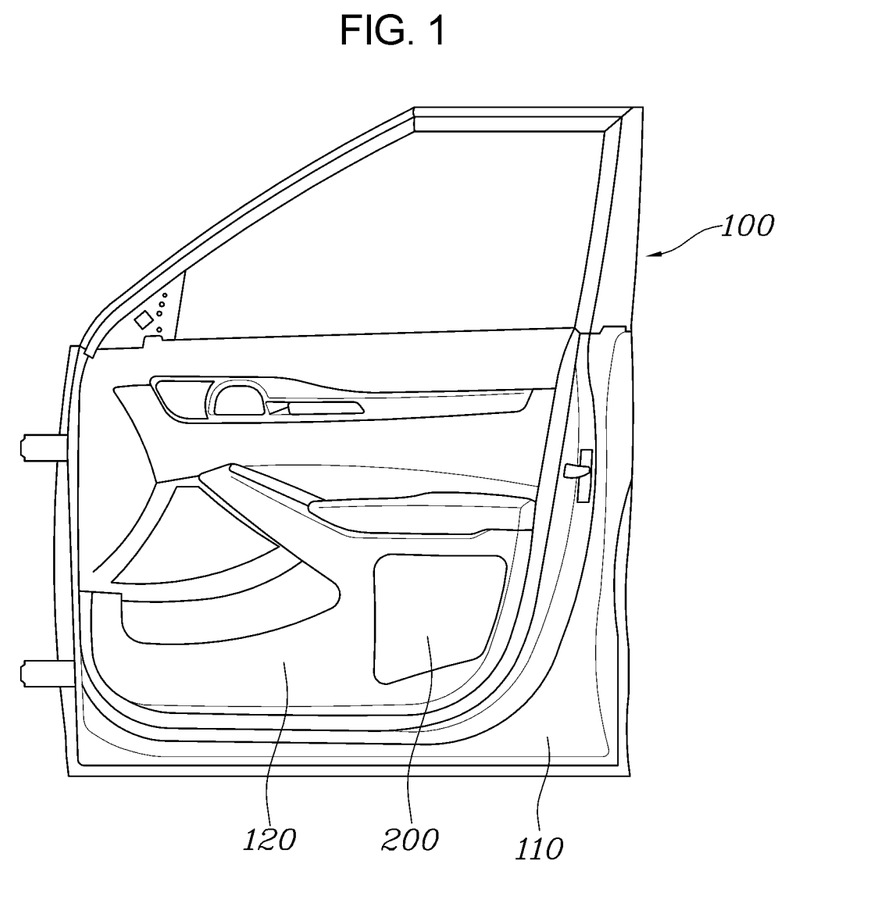
FIG. 1 is a view showing a pusher mounted on a door according to the present disclosure.
Figure 2:
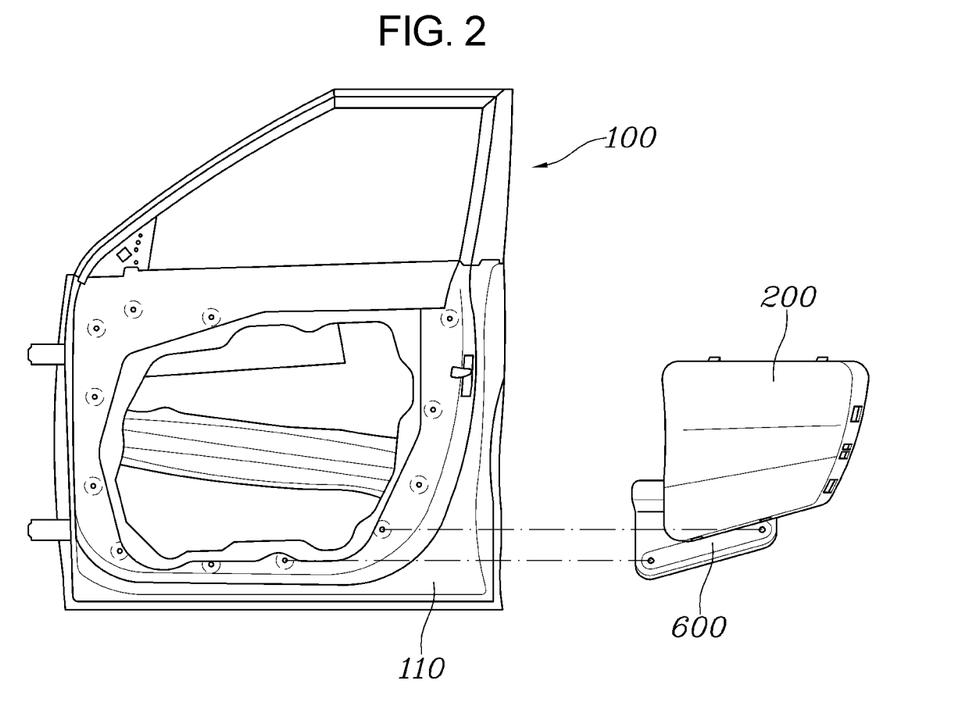
FIG. 2 is a view showing a door trim detached from the door in FIG. 1.
Figure 3:
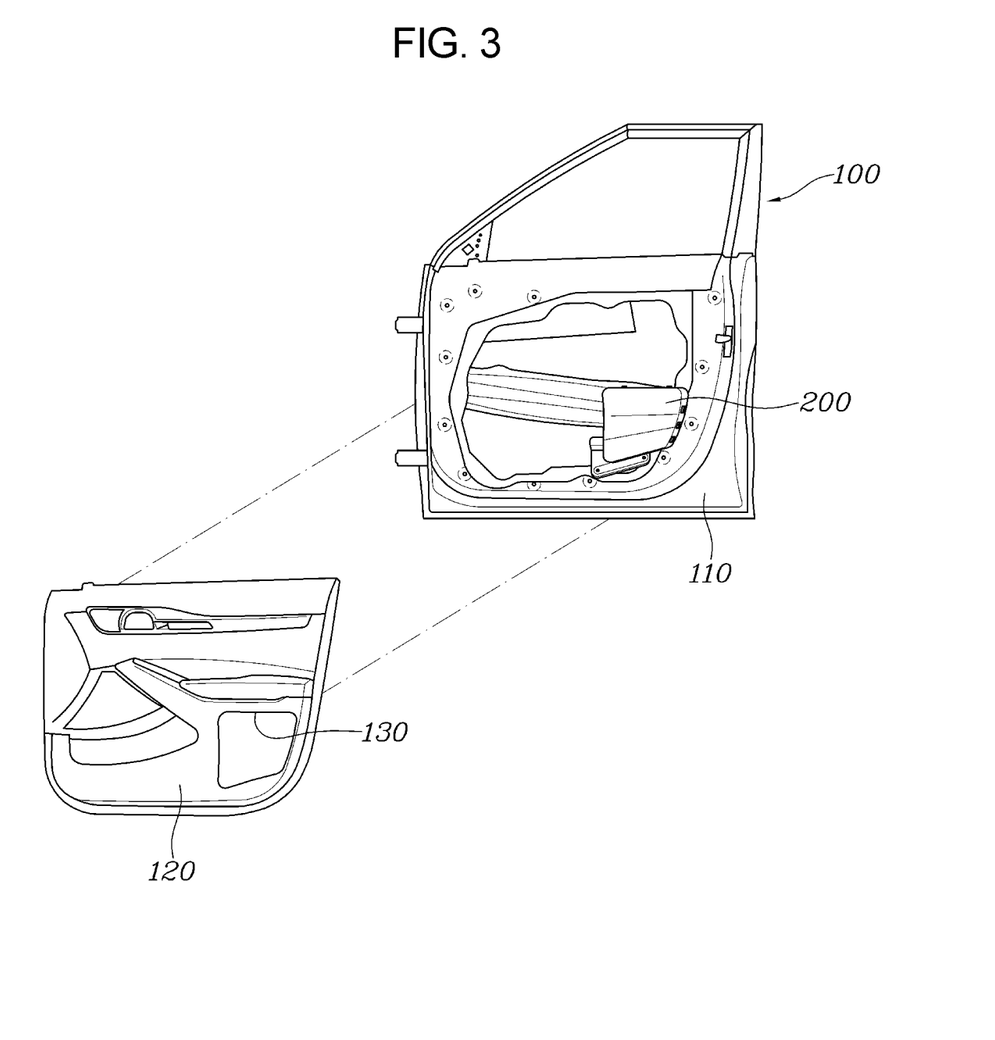
FIG. 3 is a view showing a pusher detached from a door panel.

FIGS. 1 to 3 show that a door-mounted passenger protection device according to the present disclosure includes a pusher 200 moving from the inside of the door 100 to be supported by the passenger's body, and a pusher moving device applying air pressure to the pusher 200 to move the pusher 200 toward the passenger.

For example, the pusher 200 is installed on the inner surface of the right and left doors 100 of the vehicle, and the outer surface of the pusher 200 is exposed to the interior of the vehicle compartment to face the door 100.

In particular, in the event of a side crash of the vehicle, the pusher 200 moves by air pressure and the pusher 200 protrudes from the inner surface of the door 100 and moves toward the passenger seated in a seat so that the outer surface of the pusher 200 is supported by the passenger's body.

Accordingly, in the event of a side crash, the crash energy transmitted to the passenger is absorbed by the pusher 200, thereby safely protecting the passenger.

Figure 8:
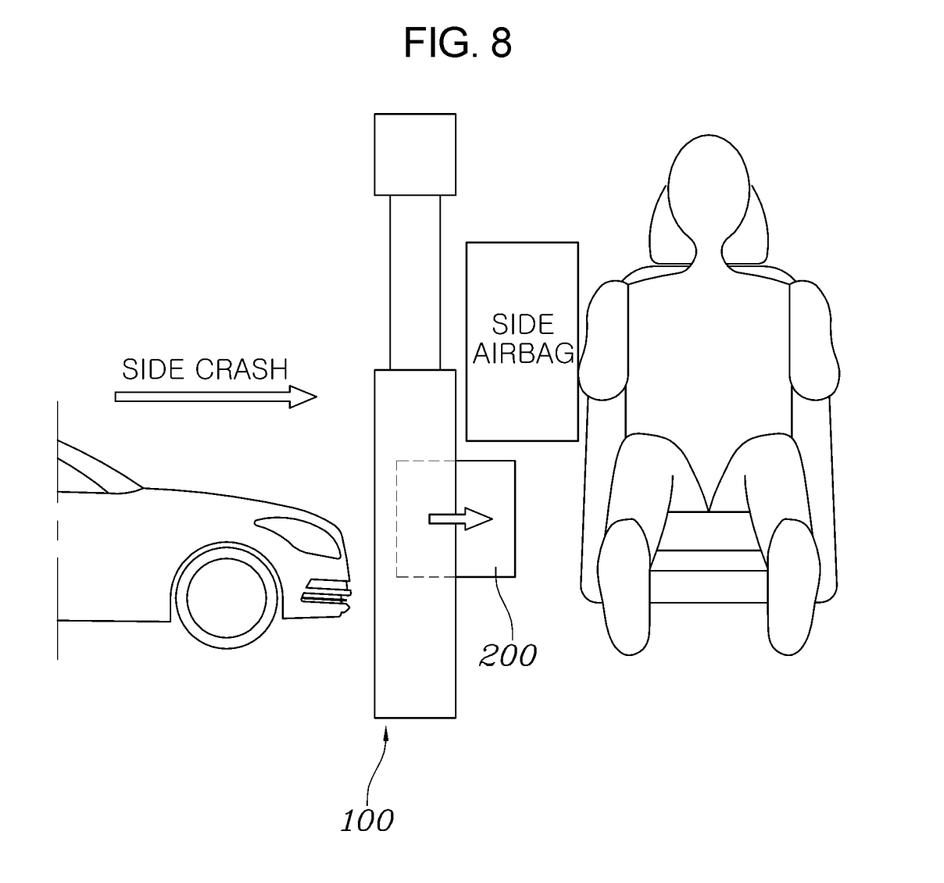
FIG. 8 is a view showing a pusher protruding in the event of a side crash according to an embodiment of the present disclosure.

FIG. 8 shows that the pusher 200 is supported by the passenger's pelvic region.

To this end, the pusher 200 is installed at a position on the inner surface of the door 100 facing the passenger's pelvic region.

Accordingly, the pusher 200 protrudes from the door 100 toward the passenger to push the passenger's pelvic region.

In this way, according to the present disclosure, the pusher 200 operates instead of an airbag cushion in the space between the door 100 and the passenger so that the pusher 200 operates smoothly even when sufficient space is not secured between the door 100 and the passenger and thus effectively protects the passenger's pelvis and femur.

On the other hand, according to the present disclosure, the pusher moving device includes an air pocket 300 provided inside the door 100 to inflate toward the pusher 200 when filled with gas and push the pusher 200 toward the passenger and a gas generator 500 supplying gas into the air pocket 300.

Figure 4:
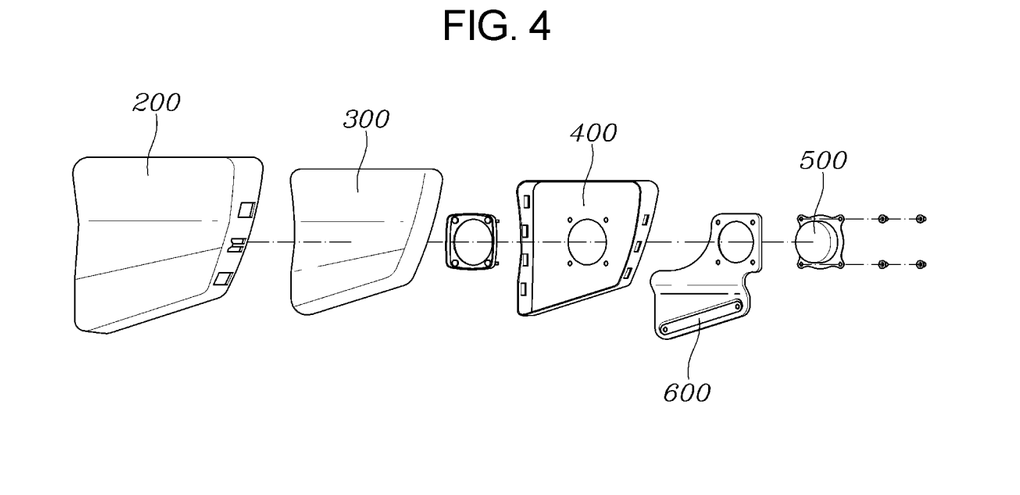
FIG. 4 is an exploded view showing a passenger protection device according to the present disclosure.

To be more specific, FIG. 4 shows that the air pocket 300 may be configured as an airbag cushion that is normally stowed in an airbag module and deploys to protect the passenger in the event of a crash of the vehicle and may be stowed at the back of the pusher 200 in a folded state.

The gas generator 500 may be configured as an inflator that supplies gas to the airbag cushion. The gas generator 500 is connected to an inlet (not shown) of the air pocket 300.

Accordingly, the gas generator 500 explodes to generate the gas at a signal received from a controller 800 to be described below, and the generated gas is supplied into the air pocket 300.

Further, the pusher 200 may be configured as an airbag cover that protects the airbag cushion in the deploying direction of the airbag cushion.

However, since a tear line is formed in the existing airbag cover, the airbag cushion needs to cut the tear line and deploy outside the airbag cover while, according to the present disclosure, the air pocket 300 pushes out the pusher 200 such that no tear line is formed in the pusher 200.

That is, when a side crash occurs while the air pocket 300 is stowed at the back of the pusher 200, the air pocket 300 inflates as the gas supplied from the gas generator 500 fills the air pocket 300 and the pusher 200 is pushed toward the passenger by the inflating force of the air pocket 300.

Accordingly, the pusher 200 moves toward the passenger to be supported by the passenger, thereby protecting the passenger's legs.

In addition, according to the present disclosure, the pusher moving device may further include a door panel 110 and a pocket housing 400.

That is, the door panel 110 installed on the door 100 and the pocket housing 400 mounted on the door panel 110 to have an air pocket 300 stowed inside and assembled to be covered by the pusher 200 to guide the movement of the pusher 200.

FIGS. 2 and 4 show that the door panel 110 is installed inside the door 100, and a box-shaped pocket housing 400 is installed in the lower portion of the door panel 110.

That is, the pocket housing 400 is coupled to the door panel 110 made of steel so that the pocket housing 400 can withstand the deploying force of the pusher 200.

The pusher 200 is formed in a box shape and inserted into the pocket housing 400 so that the pocket housing 400 serves as a guide for the movement of the pusher 200.

Further, a stowage space is formed between the pusher 200 and the pocket housing 400 and the air pocket 300 is stowed in the stowage space in a folded state so that the pusher 200 and the air pocket 300 may be installed in the door 100.

In addition, the air pocket 300 may inflate in the space between the pocket housing 400 and the pusher 200.

That is, the air pocket 300 inflates only in the stowage space between the pocket housing 400 and the pusher 200 so that the inflating force of the air pocket 300 may focus on the pusher 200.

Accordingly, the passenger's body is safely and quickly supported by rapidly moving the pusher 200 to improve the reaction speed of the passenger protection device.

On the other hand, a movement amount restriction portion restricting the movement amount of the pusher 200 moving toward the passenger may be further included.

That is, the pusher 200 may cause an injury to the passenger by hitting the passenger hard when excessively moving toward the passenger in a side crash situation, so the movement amount of the pusher 200 is restricted to a certain extent.

A preferred embodiment of the movement amount restriction portion includes an elongated slot 210 formed in the pusher 200 in the moving direction of the pusher 200 and a stopper 410 formed in the pocket housing 400 to pass through the slot 210 to engage with an inner surface of the slot 210 in the moving process of the pusher 200.

Figure 6:
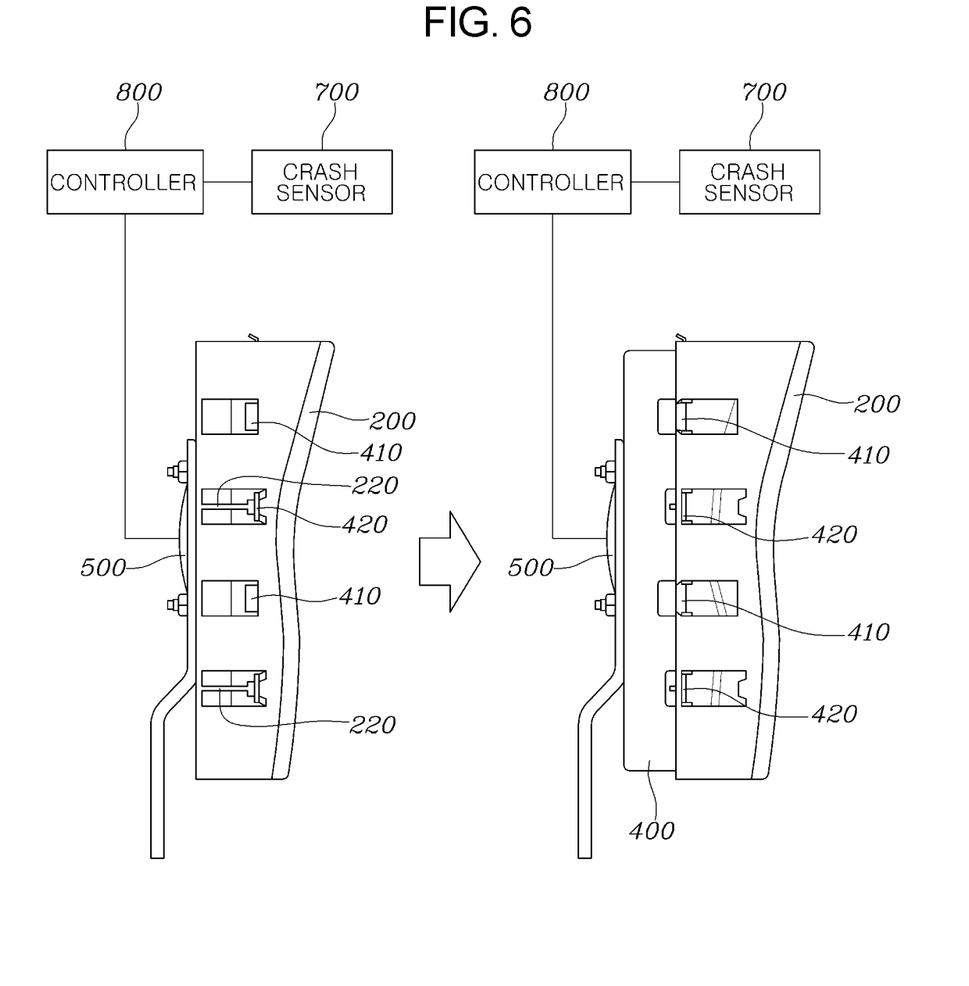
FIG. 6 is a view showing a pusher moving with respect to a pocket housing according to the present disclosure.
Figure 7:
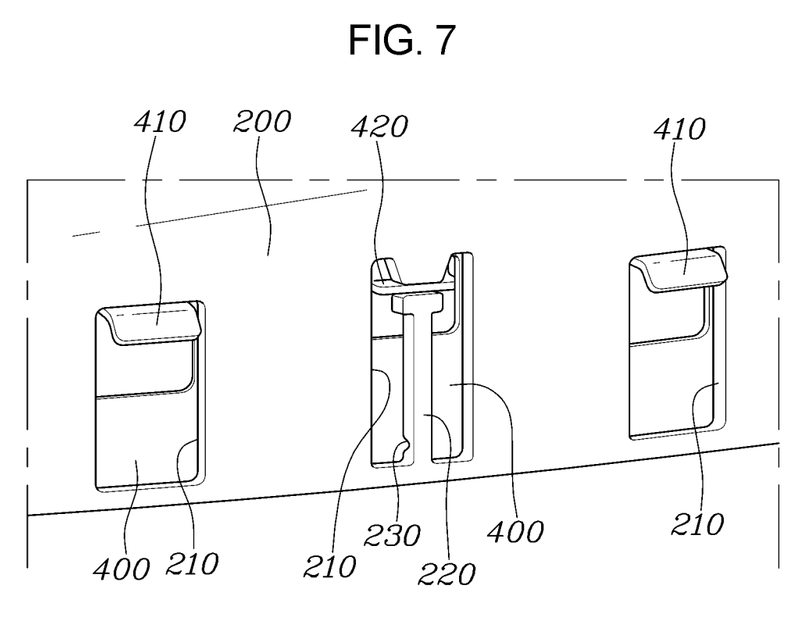
FIG. 7 is an enlarged view showing the configuration of the movement switching portion and a movement amount restriction portion according to the present disclosure.

FIGS. 6 and 7 show that a plurality of slots 210 is formed on the side wall of the pusher 200.

The slot 210 is formed in a rectangular hole shape, elongated in the moving direction of the pusher 200.

And the stopper 410 is formed on the side wall of the pocket housing 400 where the slot 210 is positioned.

The stopper 410 is formed in the shape of a hook protruding toward the slot 210 and positioned in the slot 210.

At this time, the stopper 410 may be formed to have the same right-to-left length as the slot 210.

That is, the stopper 410 is positioned at the inner front end of the slot 210 in a normal driving situation and moves toward the passenger along with the pusher 200 in the event of a side crash.

The stopper 410 may engage with the rear end of the inner rear end of the slot 210 so that the stopper 400 cannot move further and the movement amount of the pusher 200 is restricted.

On the other hand, according to the present disclosure, the passenger protection device may further include a movement switching portion that restricts the movement of the pusher 200 when the air pocket 300 does not inflate and allows the movement of the pusher 200 when the air pocket 300 inflates.

That is, the movement of the pusher 200 is mechanically restricted by the movement switching portion in a normal driving situation, so the pusher 200 is prevented from protruding toward the passenger.

However, the structure of the movement switching portion that restricts the movement of the pusher 200 deforms to allow the movement of the pusher 200 in a side crash situation so that the pusher 200 is allowed to protrude toward the passenger.

The embodiment of the movement switching portion includes an elongated slot 210 formed in the pusher 200 in the moving direction of the pusher 200, a pressing portion 420 formed in the pocket housing 400 to pass through the slot 210, and a support portion 220 temporarily restricting the movement of the pusher 200 when supported between the inner surface of the slot 210 and the pressing portion 420 and allowing the movement of the pusher 200 when the support structure deforms by the pressure applied from the pressing portion 420.

To be specific, FIGS. 6 and 7 show that a plurality of slots 210 is formed on the side wall of the pusher 200.

The slot 210 is formed in a rectangular hole shape, elongated in the moving direction of the pusher 200.

And the pressing portion 420 is formed on the side wall of the pocket housing 400 where the slot 210 is positioned.

The pressing portion 420 is formed in a planar shape to protrude toward the slot 210 and is positioned inside the slot 210. At this time, the pressing portion 420 may be formed to protrude less than the stopper 410.

That is, the pressing portion 420 is supported by the support portion 220 in a normal driving situation, so the movement of the pusher 200 is restricted.

However, when the pressing portion 420 moves together with the pusher 200 by a strong inflating force of the air pocket 300 caused by a side crash and strongly presses the support portion 220, the support portion 220 buckles or deforms to dismantle the support structure, thereby allowing the movement of the pusher 200.

In addition, the support structure of the support portion 220 may deform due to a column-shaped structure having a narrower cross-sectional width than the slot 210.

That is, the column-shaped support portion 220 having a narrower width than the slot 210 is formed at the inner front of the slot 210 so that the support portion 220 easily buckles or deforms by the strong pressing force applied from the pressing portion 420 to the support portion 220, thereby allowing the movement of the pusher 200.

In addition, a weak rigidity portion 230 may be formed in the support portion 220.

The weak rigidity portion 230 may be formed in a notched shape.

That is, a notch-shaped weak rigidity portion 230 having a relatively weak rigidity structure is formed at the end of the support portion 220 connected to the slot 210.

Accordingly, when the pressing portion 420 applies a strong force to the support portion 220, the weak rigidity portion 230 fractures and the support portion 220 deforms, thereby allowing the movement of the pusher 200.

On the other hand, according to the present disclosure, the passenger protection device includes the door panel 110 installed on the door 100 and a door trim 120 assembled to cover the door panel 110 in the door 100 and provided with a matching hole 130 matching the appearance of the pusher 200 for the pusher 200 to be inserted thereinto.

FIGS. 1 and 3 show that the door trim 120 is assembled on the side of the vehicle interior with respect to the door panel 110.

In particular, the matching hole 130 having the same shape as the perimeter of the pusher 200 is formed at the lower end of the door trim 120.

Accordingly, when the pusher 200 is matched and inserted into the matching hole 130, the pusher 200 is exposed to the outside of the door trim 120 through the matching hole 130, that is, to the interior of the vehicle compartment.

Further, in the present disclosure, the pocket housing 400 is mounted on the door panel 110 through a mounting bracket 600, and the gas generator 500 may be fastened to the mounting bracket 600 together with the pocket housing 400.

Figure 5:
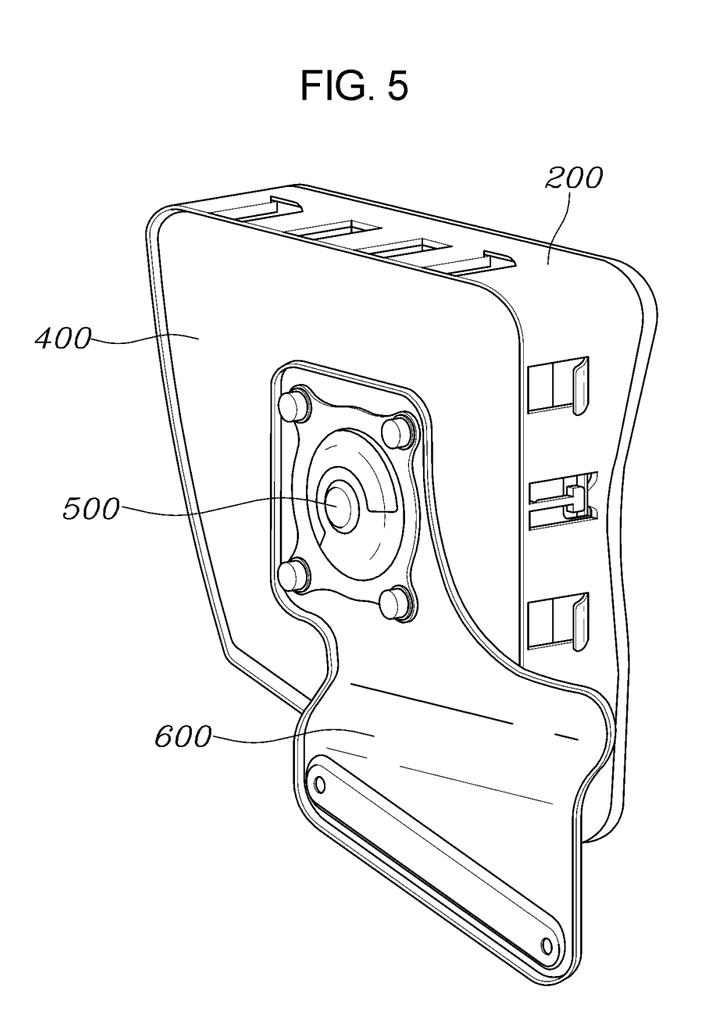
FIG. 5 is a view showing a gas generator mounted at the back of a pocket housing according to the present disclosure.

FIGS. 4 and 5 show that the lower portion of the mounting bracket 600 is fixed to the door panel 110 through hardware fastening such as bolting.

The upper portion of the mounting bracket 600 may be fastened to the pocket housing 400 through studs that secure the gas generator 500 or may be mounted on the pocket housing 400 through welding or the like.

On the other hand, in the present disclosure, a crash sensor 700 detecting a side crash and the crash direction of the vehicle and a controller 800 moving the pusher 200 installed on the door 100 toward the passenger on the side of the crash impact in the event of a crash are included. That is, the side crash of the vehicle is detected through the crash sensor 700, a crash detection signal is transmitted to the controller 800, and then the controller 800 detects the crash direction of the vehicle.

Then, the controller 800 activates the gas generator 500 installed on the side of crash impact to supply gas to the air pocket 300 from the gas generator 500.

Accordingly, the pusher 200 moves toward the passenger by the inflating force of the air pocket 300 installed on the side of the crash impact to push the passenger's pelvic region away from the crash impact, thereby protecting the passenger from the crash accident.

On the other hand, according to the present disclosure, a method of controlling a door-mounted passenger protection device includes detecting a side crash and a crash direction of a vehicle by a controller 800 and pushing a pusher 200 installed on a door 100 on the side of the crash impact toward a passenger by the controller 800 in the event of a side crash of the vehicle.

As described above, in the present disclosure, the pusher 200 installed on the door 100 is used to push the passenger away from the crash impact in the event of a side crash of the vehicle, thereby absorbing and mitigating the crash energy applied to the passenger and thus protecting the passingly safely.

Further, even when sufficient space is not secured between the door 100 and the passenger, the pusher 200 operates smoothly, thereby effectively protecting the passenger's pelvis and femur.

Further, internal pressure optimization becomes more flexible with a configuration of the independent pusher 200 distinct from the side airbag or curtain airbag, and in particular, the package size of the side airbag can be reduced due to the reduction of the protection area of the side airbag.

Only specific examples of the present disclosure have been described in detail, but it will be apparent to those skilled in the art that the present disclosure may be improved upon and modified in various ways within the scope of the technical spirit of the present disclosure.

What is claimed is:

1. A door-mounted passenger protection device comprising:
    a pusher configured to move from inside of a door toward a passenger seated in a seat to be supported by a body of the passenger;
    a pusher moving device configured to apply air pressure to the pusher to move the pusher toward the passenger; and
    a movement amount restriction portion configured to restrict an amount of movement of the pusher moving toward the passenger, the movement amount restriction portion including:
        an elongated slot formed in the pusher in a moving direction of the pusher; and
        a stopper mounted to the door to pass through the slot to engage with an inner surface of the slot during movement of the pusher.

2. The device of claim 1, wherein the pusher is configured to be supported on a pelvic region of the passenger.

3. The device of claim 1, wherein the pusher moving device comprises:
    an air pocket configured to be provided inside the door to inflate toward the pusher when filled with gas and push the pusher toward the passenger; and
    a gas generator configured to supply gas into the air pocket.

4. The device of claim 3, further comprising:
    a door panel configured to be installed on the door; and
    a pocket housing configured to be mounted on the door panel to stow the air pocket inside and assembled to be covered by the pusher to guide movement of the pusher.

5. The device of claim 4, wherein the air pocket configured to inflate in a space between the pocket housing and the pusher.

6. The device of claim 4, wherein:
    the stopper is formed in the pocket housing.

7. The device of claim 4, further comprising a movement switching portion configured to restrict movement of the pusher when the air pocket does not inflate and allow movement of the pusher when the air pocket inflates.

8. The device of claim 7, wherein the movement switching portion comprises:
    an elongated slot formed in the pusher in a moving direction of the pusher;
    a pressing portion formed in the pocket housing to pass through the slot; and
    a support portion configured to temporarily restrict movement of the pusher when supported between an inner surface of the slot and the pressing portion and allowing the movement of the pusher when the support portion deforms by pressure applied from the pressing portion.

9. The device of claim 8, wherein a support structure of the support portion deforms due to a column-shaped structure having a narrower cross-sectional width than the slot.

10. The device of claim 8, wherein a weak rigidity portion is formed in the support portion.

11. The device of claim 10, wherein the weak rigidity portion is formed in a notched shape.

12. The device of claim 1, further comprising:
a door panel configured to be installed on the door; and
a door trim configured to assembled on the door to cover the door panel and provided with a matching hole matching an appearance of the pusher for the pusher to be inserted thereinto.

13. The device of claim 4, wherein:
the pocket housing is configured to be mounted on the door panel through a mounting bracket, and
the gas generator is configured to be fastened to the mounting brackets together with the pocket housing.

14. The device of claim 1, further comprising:
a crash sensor configured to detect a side crash and crash direction of a vehicle; and
a controller configured to move the pusher installed on the door on the side of crash impact toward the passenger when there is a side crash.

15. A method of controlling a door-mounted passenger protection device, comprising:
detecting a side crash and crash direction of a vehicle by a controller;
pushing a pusher installed on a door on the side of the side crash toward a passenger by the controller when the side crash is detected; and
restricting, by a movement amount restriction portion that includes an elongated slot formed in the pusher in a moving direction of the pusher and stopper mounted to the door to pass through the slot to engage with an inner surface of the slot during movement of the pusher, an amount of movement of the pusher moving toward the passenger.

\* \* \* \* \*